US006288166B1

(12) United States Patent
Sata et al.

(10) Patent No.: US 6,288,166 B1
(45) Date of Patent: Sep. 11, 2001

(54) BINDER RESIN FOR TONER AND POSITIVELY CHARGEABLE TONER CONTAINING THE SAME

(75) Inventors: Shin-ichi Sata, Wakayama; Yasuhiro Hidaka, Kainan; Katsutoshi Aoki; Hiroyuki Kawaji, both of Wakayama; Masayuki Maruta, Hannan, all of (JP)

(73) Assignee: Kao Corporation, Tokyo (JP)

(*) Notice: Subject to any disclaimer, the term of this patent is extended or adjusted under 35 U.S.C. 154(b) by 0 days.

(21) Appl. No.: 08/291,825

(22) Filed: Aug. 17, 1994

(30) Foreign Application Priority Data

Sep. 3, 1993 (JP) ..................................................... 5-219658

(51) Int. Cl.[7] ............................ C08L 51/08; C08L 67/02; C08L 67/06

(52) U.S. Cl. .............................. 525/69; 525/63; 525/166; 525/169

(58) Field of Search .................................... 525/169, 166, 525/69, 63

(56) References Cited

U.S. PATENT DOCUMENTS

| | | |
|---|---|---|
| 2,297,691 | 10/1942 | Carlson . |
| 2,357,809 | 9/1944 | Carlson . |
| 4,246,332 | 1/1981 | Tanaka et al. . |

FOREIGN PATENT DOCUMENTS

| | | |
|---|---|---|
| 0367265 | 5/1990 | (EP) . |
| 0380813 | 8/1990 | (EP) . |
| 0479275 | 8/1992 | (EP) . |
| 0622689 | 11/1994 | (EP) . |
| 49006931 | 1/1974 | (JP) . |
| 54114245 | 9/1979 | (JP) . |
| 56116043 | 9/1981 | (JP) . |
| 57060339 | 4/1982 | (JP) . |
| 59045453 | 3/1984 | (JP) . |
| 63279265 | 11/1988 | (JP) . |
| 1156759 | 6/1989 | (JP) . |
| 2005073 | 1/1990 | (JP) . |
| 2029664 | 1/1990 | (JP) . |
| 2161464 | 6/1990 | (JP) . |
| 2000881 | 1/1999 | (JP) . |

*Primary Examiner*—Patricia A. Short
(74) *Attorney, Agent, or Firm*—Birch, Stewart , Kolasch & Birch, LLP

(57) ABSTRACT

The positively chargeable toner includes a binder resin and a coloring agent, the binder resin including (a) a resin (1) capable of forming a matrix in the toner, the resin (1) being a hybrid resin of a polyester resin and a vinyl resin; and (b) a resin (2) capable of forming a domain dispersed in the matrix formed by the resin (1), the resin (2) being a vinyl resin having a positive charge functional group. This positively chargeable toner has a good evenness of chargeability and a high charging-up speed with a small proportion of a reversely charged toner upon triboelectric charging. Moreover, in a heat roller fixing method, fixing at a low temperature can be performed without using an offset inhibiting liquid.

10 Claims, No Drawings

BINDER RESIN FOR TONER AND POSITIVELY CHARGEABLE TONER CONTAINING THE SAME

BACKGROUND OF THE INVENTION

1. Field of the Invention

The present invention relates to a binder resin for a toner and also to a positively chargeable toner containing such a binder resin, wherein the toner is used for developing latent images in electrophotography, electrostatic recording, electrostatic printing, etc.

2. Discussion of the Related Art

As disclosed in U.S. Pat Nos. 2,297,691, 2,357,809, and other publications, conventional electrophotography comprises the steps of forming an electrostatic latent image by evenly charging a photoconductive insulating layer and subsequently exposing the layer to eliminate the charge on the exposed portion, and visualizing the formed image by adhering a colored charged fine powder known as a toner to the latent image (a developing process); transferring the obtained visible image to an image-receiving sheet such as a transfer paper (a transfer process); and permanently fixing the transferred image by heating, pressure application or other appropriate means of fixing (a fixing process).

As indicated above, a toner must meet the requirements not only in the development process but also in the transfer process and fixing process.

In general, in order to obtain a positively chargeable toner, an binder resin used therefor is a styrene-acrylic resin which can be easily positively charged. However, the styrene-acrylic resin has low mechanical properties, so that the resulting toner is less durable for continuous printing. Also, when a resin having a relatively high molecular weight is used in order to solve this problem, the fixing ability of the toner becomes extremely poor. Further, although a polyester resin having excellent mechanical properties can provide both good fixing ability and stability upon continuous printing, its negative chargeability is too strong, making it difficult to provide positive chargeability.

In order to solve the above problems, the following methods for blending polyester resins having excellent fixing ability with styrene-acrylic resins having a small change in the triboelectric charge under the high-temperature, high-humidity conditions when compared with that under normal-temperature, normal-humidity conditions have been known. For instance, examples of such methods include:

(1) Methods for blending polyester resins with styrene-acrylic resins (see Japanese Patent Laid-Open Nos. 49-6931, 54-114245, 57-70523, and 2-161464);

(2) Methods for chemically linking polyester resins with styrene-acrylic resins (see Japanese Patent Laid-Open No. 56-116043);

(3) Methods for copolymerizing unsaturated polyesters with vinyl monomers (see Japanese Patent Laid-Open Nos. 57-60339, 63-279265, 1-156759, and 2-5073);

(4) Methods for copolymerizing polyester resins having a (meth)acryloyl group with vinyl monomers (see Japanese Patent Laid-Open No. 59-45453);

(5) Methods for copolymerizing reactive polyesters with vinyl monomers in the presence of polyester resins (see Japanese Patent Laid-Open No. 2-29664); and (6) Methods for forming a block copolymer by linking polyester resins and vinyl resins with an ester bond (see Japanese Patent Laid-Open No. 2-881).

However, since the polyester resins have inherently poor compatibility with the styrene-acrylic resins, mere mechanical blending of the components may result in poor dispersion of the resins and the internal additives such as a carbon black at the time of production of the toner in certain blending ratios. This may in turn cause unevenness in the triboelectric charge of the toner, thereby causing problems such as background in the formed images. Further, when the two types of resins have different molecular weights, the differences in their melt viscosities are likely to take place, thereby making it difficult to make the grain size of the resin for the dispersed domain fine. In such a case, when a toner is produced with such resins, the dispersion of the internal additives such as a carbon black becomes extremely poor, so that such a problem arises that the resulting toner results in poor image quality. Moreover, in the case where the vinyl monomers are copolymerized with the reactive polyesters, it is applicable only in a restricted compositional range in order not to allow gelation to take place.

SUMMARY OF THE INVENTION

An object of the present invention is to provide a binder resin for a toner which can give good even chargeability and a high charging-up speed for the toner.

Another object of the present invention is to provide a positively chargeable toner having good even chargeability and a high charging-up speed with a small proportion of a reversely charged toner by using the binder resin mentioned above.

As a result of intense research in view of the above problems, the present inventors have found a positively chargeable toner having excellent low-temperature fixing ability and offset resistance which maintains good stability under severe conditions in triboelectric charge and image quality can be obtained by using a particular combination of binder resins, and thus providing excellent durability in the obtained developer. The present invention has been completed based on this finding.

Specifically, the present invention is concerned with the following:

(1) A binder resin for a toner comprising:

a resin (1) capable of forming a matrix in the toner, the resin (1) being a hybrid resin of a polyester resin and a vinyl resin; and a resin (2) capable of forming a domain dispersed in the matrix formed by the resin (1), the resin (2) being a vinyl resin having a positive charge functional group; and (2) A positively chargeable toner comprising the binder resin described in (1) above and a coloring agent. The present invention is also concerned with a positively chargeable toner further containing a compound having the following general formula (I) and/or (II):

(I)

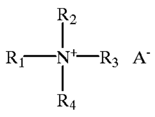

(II)

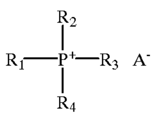

wherein $R_1$, $R_2$, $R_3$, and $R_4$, which may be identical or different, independently represent an alkyl group, an alkoxy group, an aryl group, or an allyl group, each of which may form a ring; and $A^-$ represents an anion.

A positively chargeable toner containing the binder resin of the present invention has a good evenness of chargeability and high charging-up speed with a small proportion of a reversely charged toner upon triboelectric charging. Moreover, in a heat roller fixing method, fixing at a low temperature can be performed without using an offset inhibiting liquid.

DETAILED DESCRIPTION OF THE INVENTION

The binder resin of the present invention is a binder resin for a toner comprising a resin (1) capable of forming a matrix in the toner and a resin (2) capable of forming a domain dispersed in the matrix formed by the resin (1). The resin (1) is a hybrid resin of a polyester resin and a vinyl resin, and the resin (2) is a vinyl resin having a positive charge functional group.

First, the preferred embodiment of the resin (1) will be explained in detail below.

The resin (1) is a hybrid resin of a polyester resin and a vinyl resin, the polyester resin and the vinyl resin being chemically linked with each other. The resin (1) can be produced using monomers of a polyester resin, monomers of a vinyl resin, and a compound reacting with both monomers.

As for the monomers of polyester resins, alcohols such as a dihydric alcohol or a trihydric or higher polyhydric alcohol, and carboxylic acid components such as a dicarboxylic acid or a tricarboxylic or higher polycarboxylic acid, an acid anhydride thereof or an ester thereof are used.

Examples of the dihydric alcohols include bisphenol A alkylene oxide adducts such as polyoxypropylene(2.2)-2,2-bis(4-hydroxyphenyl)propane, polyoxypropylene(3.3)-2,2-bis(4-hydroxyphenyl)propane, polyoxyethylene(2.0)-2,2-bis(4-hydroxyphenyl)propane, polyoxypropylene(2.0)-polyoxyethylene(2.0)-2,2-bis(4-hydroxyphenyl)propane, and polyoxypropylene(6)-2,2-bis(4-hydroxyphenyl) propane; ethylene glycol, diethylene glycol, triethylene glycol, 1,2-propylene glycol, 1,3-propylene glycol, 1,4-butanediol, neopentyl glycol, 1,4-butenediol, 1,5-pentanediol, 1,6-hexanediol, 1,4-cyclohexanedimethanol, dipropylene glycol, polyethylene glycol, polypropylene glycol, polytetramethylene glycol, bisphenol A, hydrogenated bisphenol A, propylene adducts of bisphenol A, ethylene adducts.of bisphenol A, and other dihydric alcohols.

Examples of the trihydric or higher polyhydric alcohols include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane, 1,3,5-trihydroxymethylbenzene, and other trihydric or higher polyhydric alcohols.

Among these alcohols, polyoxypropylene(2.2)-2,2-bis(4-hydroxyphenyl)propane and polyoxyethylene(2.0)-2,2-bis (4-hydroxyphenyl)propane are preferably used.

In the present invention, these dihydric alcohol monomers and trihydric or higher polyhydric alcohol monomers may be used singly or in combination.

As for the acid components, examples of the dicarboxylic acid components include maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenylsuccinic acid, isododecenylsuccinic acid, n-dodecylsuccinic acid, isododecylsuccinic acid, n-octenylsuccinic acid, n-octylsuccinic acid, isooctenylsuccinic acid, isooctylsuccinic acid, acid anhydrides thereof, lower alkyl esters thereof, and other dicarboxylic acid components.

Among these dicarboxylic acid components, a preference is given to maleic acid, fumaric acid, terephthalic acid, isododecenylsuccinic acid, acid anhydrides thereof, and lower alkyl esters thereof.

Examples of the tricarboxylic or higher polycarboxylic acid components include 1,2,4-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl) methane, 1,2,7,8-octanetetracarboxylic acid, pyromellitic acid, Empol trimer acid, acid anhydrides thereof, lower alkyl esters thereof, and other tricarboxylic or higher polycarboxylic acid components. Among them, in particular, 1,2, 4-benzenetricarboxylic acid, namely trimellitic acid, or a derivative thereof is preferably used because it is inexpensive and the reaction control is easy.

In the present invention, these dicarboxylic acid monomers and trihydric or higher polycarboxylic acid monomers may be used singly or in combination.

As for the monomers of the vinyl resins used for the resin (1), examples thereof include styrene and styrene derivatives such as styrene, o-methylstyrene, m-methylstyrene, p-methylstyrene, a-methylstyrene, p-ethylstyrene, 2,4-dimethylstyrene, p-chlorostyrene, and vinylnaphthalene; ethylenic unsaturated monoolefins such as ethylene, propylene, butylene, and isobutylene; vinyl esters such as vinyl chloride, vinyl bromide, vinyl iodide, vinyl acetate, vinyl propionate, vinyl formate, and vinyl caproate; ethylenic monocarboxylic acids and esters thereof such as acrylic acid, methyl acrylate, ethyl acrylate, n-propyl acrylate, isopropyl acrylate, n-butyl acrylate, isobutyl acrylate, tert-butyl acrylate, amyl acrylate, cyclohexyl acrylate, n-octyl acrylate, isooctyl acrylate, decyl acrylate, lauryl acrylate, 2-ethylhexyl acrylate, stearyl acrylate, methoxyethyl acrylate, 2-hydroxyethyl acrylate, glycidyl acrylate, 2-chloroethyl acrylate, phenyl acrylate, methyl a-chloroacrylate, methacrylic acid, methyl methacrylate, ethyl methacrylate, n-propyl methacrylate, isopropyl methacrylate, n-butyl methacrylate, isobutyl methacrylate, tert-butyl methacrylate, amyl methacrylate, cyclohexyl methacrylate, n-octyl methacrylate, isooctyl methacrylate, decyl methacrylate, lauryl methacrylate, 2-ethylhexyl methacrylate, stearyl methacrylate, methoxyethyl methacrylate, 2-hydroxyethyl methacrylate, glycidyl methacrylate, phenyl methacrylate, dimethylaminoethyl methacrylate, and diethylaminoethyl methacrylate; substituted monomers of ethylenic monocarboxylic acids such as acrylonitrile, methacrylonitrile, and acrylamide; ethylenic dicarboxylic acids and substituted monomers thereof such as dimethyl maleate; vinyl ketones such as vinyl methyl ketone; vinyl ethers such as vinyl ethyl ether; vinylidene halides such as vinylidene chloride. In the present invention, a preference is given to a combination of styrene and acrylic acid or esters thereof, or styrene and methacrylic acid or esters thereof from the viewpoint of well dispersing the coloring agent, wax, or other additives therein.

A crosslinking agent may be added, if necessary, to the monomer composition. In such a case, any known crosslinking agents may be appropriately used. Examples of crosslinking agents added include any of the generally known crosslinking agents such as divinylbenzene, divinylnaphthalene, polyethylene glycol dimethacrylate, diethylene glycol diacrylate, triethylene glycol diacrylate, 1,3-butylene glycol dimethacrylate, 1,6-hexylene glycol dimethacrylate, neopentyl glycol dimethacrylate, dipropylene glycol dimethacrylate, polypropylene glycol dimethacrylate, 2,2'-bis(4-methacryloxydiethoxyphenyl) propane, 2,2'-bis(4-acryloxydiethoxyphenyl)propane, trimethylolpropane trimethacrylate, trimethylolpropane triacrylate, tetramethylolmethane tetraacrylate, dibromoneopentyl glycol dimethacrylate, and diallyl phthalate. Among them, a preference is given to divinylbenzene and polyethylene glycol dimethacrylate. These crosslinking agents may be used alone or, if necessary, in combination of two or more.

The amount of these crosslinking agents used is preferably 0.001 to 15% by weight, more preferably 0.1 to 10% by weight, based on the polymerizable monomers. When the amount of these crosslinking agents used is more than 15% by weight, the resulting toner is unlikely to be melted with heat, thereby resulting in poor heat fixing ability or in poor heat-and-pressure fixing ability. On the contrary, when the amount used is less than 0.001% by weight, in the heat-and-pressure fixing, a part of the toner cannot be completely fixed on a paper but rather adheres to the surface of a roller, which in turn is transferred to a subsequent paper, namely an offset phenomenon takes place.

Examples of the polymerization initiators which are used in the polymerization of monomers of the vinyl resins include azo and diazo polymerization initiators such as 2,2'-azobis(2,4-dimethylvaleronitrile), 2,2'-azobisisobutyronitrile, 1,1'-azobis(cyclohexane-1-carbonitrile), and 2,2'-azobis-4-methoxy-2,4-dimethylvaleronitrile; and peroxide polymerization initiators such as benzoyl peroxide, methyl ethyl ketone peroxide, isopropyl peroxycarbonate, cumene hydroperoxide, 2,4-dichlorobenzoyl peroxide, lauroyl peroxide, and dicumyl peroxide.

For the purposes of controlling the molecular weight or molecular weight distribution of the polymer or controlling the reaction time, two or more polymerization initiators may be used in combination.

The amount of the polymerization initiator used is 0.1 to 20 parts by weight, preferably 1 to 10 parts by weight, based on 100 parts by weight of the monomers of the vinyl resins.

In the present invention, in order to chemically link the polyester resin with the vinyl resin, polymerization is carried out using a compound capable of reacting with monomers of both the polyester resin and the vinyl resin (hereinafter simply referring as "a compound reacting with both monomers").

Examples of the compounds reacting with both monomers include fumaric acid, acrylic acid, methacrylic acid, citraconic acid, maleic acid, and dimethyl fumarate, which are also mentioned as examples of the monomers of the polyester resins and the vinyl resins. Among them, a preference is given to fumaric acid, acrylic acid, and methacrylic acid.

The amount of the compounds reacting with both monomers used is 0.1 to 20% by weight, preferably 0.5 to 10% by weight, based on the entire starting material monomers.

The polymerization reaction is, for instance, carried out by the steps of adding a mixture comprising a starting material monomer of the vinyl resin dropwise to a mixture comprising starting material monomers for polyesters under temperature conditions appropriate for the addition polymerization reaction, the condensation polymerization being partly carried out concurrently with the addition polymerization reaction in the presence of a compound reacting with both monomers; keeping the temperature of the obtained mixture under said temperature conditions to complete only the addition polymerization reaction; and then raising the reaction temperature to increase degree of the condensation polymerization. Here, although the temperature conditions appropriate for the addition polymerization reaction may vary depending upon the types of the polymerization initiators, they are normally 50 to 180° C., and the optimum temperature for increasing the degree of the condensation polymerization is normally 190 to 270° C. As mentioned above, the two polymerization reactions are carried out concurrently to give a hybrid resin. Here, the hybrid resin refers to a resin of a polyester resin and a vinyl resin partially linking each other with a chemical bond. There are two embodiments for the hybrid resin. In one embodiment, a polyester resin is uniformly mixed with a vinyl resin. In the other embodiment, a vinyl resin is dispersed in a polyester resin, thereby forming an islands-sea structure with the vinyl resin.

The amount of the polyester resin in the resin (1), though not limited thereto, is preferably 51 to 95% by weight, more preferably 60 to 80% by weight.

Next, the preferred embodiment of the resin (2) will be explained in detail below.

In the present invention, as for the resin (2), a vinyl resin having a positive charge functional group can be used. Particularly, nitrogen-containing and/or phosphorus-containing functional groups are preferred as positive charge functional groups. The vinyl resin having a positive charge functional group can be obtained, for example, by copolymerizing one or more monomers for forming a vinyl resin with one or more nitrogen-containing monomers and/or one or more phosphorus-containing monomers. Here, as for the monomers for forming vinyl resins, the same kinds of monomers as those for the vinyl resins in the resin (1) can be used.

Examples of the nitrogen-containing monomers include N,N-dialkylaminoalkyl (meth)acrylates such as N,N-dimethylaminomethyl (meth)acrylate, N,N-dimethylaminoethyl (meth)acrylate, and N,N-diethylaminoethyl (meth)acrylate; N,N-dialkylaminoalkyl (meth)acrylamides such as N,N-dimethylaminoethyl (meth) acrylamide and N,N-dimethylaminopropyl (meth) acrylamide; N-vinyl compounds such as N-vinylpyrrole, N-vinylpyrrolidone, and N-vinylcarbazole; vinylpyridine; morpholinoethyl (meth)acrylate; and quaternary monomers such as (meth)acryloyloxyethyl trimethyl ammonium chloride and (meth)acryloylaminopropyl trimethyl ammonium chloride. Examples of the phosphorus-containing monomers include allyltriphenylphosphonium bromide and allyltriphenylphosphonium chloride.

Among the nitrogen-containing and/or phosphorus-containing functional groups, a preference is given to N,N-dialkylaminoalkyl (meth)acrylates, N,N-dialkylaminoalkyl (meth)acrylamides, and N-vinylpyrrolidone.

Also, by using a nitrogen-containing compound as a polymerization initiator in the production of the resin (2), a functional group may be introduced at an end of a molecule of the resin (2), which in turn provides the resulting toner with stable positive triboelectric charge. Examples of compounds having a nitrogen atom in a molecule include azoamidine compounds such as 2,2'-azobis(2-methyl-N-phenylpropionamidine), 2,2'-azobis[N-(4-chlorophenyl)-2-methylpropionamidine], 2,2'-azobis[N-(4-hydroxyphenyl)-2-methylpropionamidine], 2,2'-azobis[N-(4-aminophenyl)-2-methylpropionamidine], 2,2'-azobis[2-methyl-N-(phenylmethyl)propionamidine], 2,2'-azobis(2-methyl-N-2-propenylpropionamidine), 2,2'-azobis(2-methylpropionamidine), and 2,2'-azobis[N-(2-hydroxyethyl)-2-methyl-propionamidine], hydrochloric salts thereof, methanesulfonic salts thereof, and p-toluenesulfonic salts thereof; cyclic azoamidine compounds such as 2,2'-azobis[2-(5-methyl-2-imidazolin-2-yl) propane], 2,2'-azobis[2-(2-imidazolin-2-yl)propane], 2,2'-azobis[2-(4,5,6,7-tetrahydro-1H-1,3-diazepin-2--yl) propane], 2,2'-azobis[2-(3,4,5,6-tetrahydropyrimidin-2-yl) propane], 2,2'-azobis[2-(5-hydroxy-3,4,5,6-tetrahydropyrimidin-2-yl)propane], and 2,2'-azobis[2-{1-(2-hydroxyethyl)-2-imidazolin-2-yl}propane], hydrochloric salts thereof, methanesulfonic salts thereof, and p-toluenesulfonic salts thereof.

The resin (2) is obtained by conventional methods such as a solution polymerization method, an emulsification polymerization method, a bulk polymerization method, and a dispersion polymerization method using the above-mentioned monomers.

In the present invention, the binder resin of the present invention is obtained by blending resin (1) with resin (2). The blending ratio (parts by weight) of resin (1) to resin (2) is 99/1-50/50, preferably 95/5-70/30. When the blending ratio of the resin (1) to resin (2) is lower than 50/50, an islands-sea structure is not formed, and a layered structure is formed instead.

The average diameter of the dispersed domain comprising the resin (2) can be controlled by the following methods:

(a) Controlling the average diameter by changing the compatibility of the vinyl resin component ini the resin (1) with the resin (2); and (b) Controlling the average diameter by changing the blending ratio of the resin (1) to the resin (2).

In certain cases where a method of controlling the average diameter by changing the blending ratio of the resin (1) to the resin (2) is employed, the amount of the resin (1) is preferably 55 to 98 parts by weight, and the amount of the resin (2) is preferably 45 to 2 parts by weight, from the viewpoint of preventing the obtained triboelectric charge from possibly falling outside the suitable range.

The average diameter of the dispersed domain comprising the resin (2) is preferably 0.05 to 1.0 μm. When the diameter of the dispersed domain is too small, charging-up speed is low, and distribution of triboelectric charge is wide. When the diameter of the dispersed domain is too large, the distribution of triboelectric charge becomes wide, thereby producing some reversely charged toners, even though charging-up speed is high. Also, when the diameter of the dispersed domain becomes large, the mechanical properties of the resulting toner are undesirably reduced. In this case, if printing is continuously carried out, cracking takes place in the binder resin, so that fine powders are undesirably increased, thereby making the stability of the resulting toner with passage of time undesirably poor.

Here, the diameter of the dispersed domain can be measured by the method comprising the steps of slicing the resin having a diameter of about 0.2 mm using a microtome to a thickness of 100 to 300 nm, observing the obtained thin slices using a transmission-type scanning electron microscope (for instance, "JEM-2000," manufactured by JEOL (Nihon Denshi Kabushiki Kaisha)), and then analyzing observed images by a known method.

In the present invention, the binder resin of the present invention comprises the resin (1) and the resin (2), which may further contain other resins such as polyamide resins, polyester resins, styrene-acrylic resins, and epoxy resins in an amount of up to 30% by weight, based on the binder resin.

The toner of the present invention is a positively chargeable toner comprising at least the binder resin mentioned above comprising the resins (1) and (2) and a coloring agent. Further, from the viewpoint of charging stability, the positively chargeable toner of the present invention may further contain a compound having the following general formula (I) and/or (II):

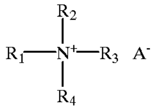

(I)

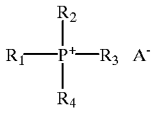

(II)

wherein $R_1$, $R_2$, $R_3$, and $R_4$, which may be identical or different, independently represent an alkyl group, an alkoxy group, an aryl group, or an allyl group, each of which may form a ring; and $A^-$ represents an anion.

In the compound having the general formula (I) or (II), $R_1$, $R_2$, $R_3$, and $R_4$, which may be the same or different, independently represent an alkyl group, an alkoxy group, an aryl group, and an allyl group, each preferably having not less than 12 carbon atoms, each of which may form a ring. $A^-$ represents an anion, and typical examples thereof include halogen, naphtholsulfonate, heteropolyacid anion, methylsulfonate, p-toluenesulfonate, tetrafluoroborate, and tetraphenylborate.

Examples of compounds having the general formula (I) or (II) include quaternary ammonium salt compounds such as "BONTRON P-51" (manufactured by Orient Chemical Co., Ltd.), cetyltrimethylammonium bromide, "COPY CHARGE PX VP435" (manufactured by Hoechst), "TP-415" (manufactured by Hodogaya Chemical Co., Ltd.), "TP-302" (manufactured by Hodogaya Chemical Co., Ltd.), cetylpyridinium chloride, cetylpyridinium bromide, benzylcetyldimethylammonium chloride, benzylcetyldimethylammonium bromide, with a preference given to BONTRON P-51 and TP-415.

The compound having the general formula (I) or (II) used in the present invention may be added in an amount of 0.1 to 8.0 parts by weight, preferably 0.2 to 5.0 parts by weight, based on 100 parts by weight of the binder resin, in order to provide a more even distribution of triboelectric charge and a higher charging-up speed.

When the resins (1) and (2) in the present invention are used as the components of the binder resins in the production of toners, they may be added together with a coloring agent, and, if necessary, such additives as a charge control agent and a magnetic particulate.

Examples of the coloring agents used in the present invention include various carbon blacks which may be produced by a thermal black method, an acetylene black method, a channel black method, and a lamp black method; a nigrosine dye, Phthalocyanine Blue, Permanent Brown FG, Brilliant Fast Scarlet, Pigment Green B, Rhodamine-B Base, Solvent Red 49, Solvent Red 146, Solvent Blue 35, and the mixtures thereof. The coloring agent is usually used in an amount of about 1 to 15 parts by weight based on 100 parts by weight of the binder resin.

In the present invention, if necessary, as the charge control agents the following charge control agents may be used. Examples thereof include nigrosine dyes such as "NIGROSINE BASE EX" (manufactured by Orient Chemical Co., Ltd.), "OIL BLACK BS" (manufactured by Orient Chemical Co., Ltd.), "OIL BLACK SO" (manufactured by Orient Chemical Co., Ltd.), "BONTRON N-01" (manufactured by Orient Chemical Co., Ltd.), "BONTRON N-04" (manufactured by Orient Chemical Co., Ltd.), "BONTRON N-07" (manufactured by Orient Chemical Co., Ltd.), "BONTRON N-11" (manufactured by Orient Chemical Co., Ltd.), and "BONTRON N-13" (manufactured by Orient Chemical Co., Ltd.); triphenylmethane dyes containing tertiary amines as side chains such as "COPY BLUE PR" (manufactured by Hoechst); polyamine resins such as "AFP-B" (manufactured by Orient Chemical Co., Ltd.); and imidazole derivatives such as "PLZ-2001" (manufactured by Shikoku Kasei K.K.) and "PLZ-8001" (manufactured by Shikoku Kasei K.K.).

The above charge control agents may be added to the binder resin in an amount of 0.1 to 8.0% by weight, preferably 0.2 to 5.0% by weight, based on the binder resin.

In the production of the toners, offset inhibitors such as waxes including polyolefins, or property improvers, for instance, free flow agents such as inorganic fine particles including hydrophobic silica, titanium oxide, and alumina may be added.

The toners having an average particle diameter of 5 to 15 μm can be obtained by the steps of uniformly dispersing the binder resin of the present invention as an essential component, a coloring agent, and in certain cases, property improvers, kneading the obtained mixture, cooling the kneaded mixture, pulverizing the cooled mixture, and then classifying the pulverized product, all of the steps being carried out by known methods. Also, the toners are blended with particulate magnetic materials such as iron oxide carriers, spherical iron oxide carrier or ferritic carriers, or the above carriers provided with a resin coating, to give a dry-type two-component developer.

Alternatively, the toner may be used as a one-component developer which is charged by pressing against a pressing member.

A magnetic toner can be prepared by adding a particulate magnetic material to the starting material containing the above binder resin used in toner production. Examples of the particulate magnetic materials include ferrite, hematite, magnetite, ferromagnetic metals, such as iron, cobalt, and nickel, alloys thereof, and compounds containing these elements. Such a magnetic material is uniformly dispersed in the starting material containing the above binder resin in the form of a fine powder having an average particle diameter of 0.1 to 1 μm. The content of these magnetic materials is 30 to 70 parts by weight, based on 100 parts by weight of the binder resin.

EXAMPLES

The present invention is hereinafter described in more detail by means of the following working examples, comparative examples, and test example, but the present invention is not restricted to these examples.

In these examples, the glass transition temperature (Tg) and the molecular weight determination by gel permeation chromatography (hereinafter simply referring to as "GPC") of each of the obtained binder resin are measured by the following methods.

Glass Transition Temperature (Tq)

The glass transition temperature (Tg) refers to the temperature of an intersection of the extension of the baseline of not more than the glass transition temperature and the tangential line showing the maximum inclination between the kickoff of the peak and the top thereof as determined with a sample using a differential scanning calorimeter ("DSC Model 200," manufactured by Seiko Instruments, Inc.), at a heating rate of 10° C./min. The sample is treated before measurement using the DSC by raising its temperature to 100° C., keeping at 100° C. for 3 minutes, and cooling the hot sample at a cooling rate of 10° C./min. to room temperature.

Molecular Weight Determination by GPC

The molecular weight of the obtained binder resin is measured by maintaining the temperature of a column in a thermostat set at 40° C. and injecting 100 μl of a chloroform solution of the sample, which is adjusted to have a sample concentration of 0.05 to 0.5% by weight, while flowing chloroform at a flow rate of 1 ml per minute as an eluent. The molecular weight of the sample is calculated by the molecular weight distribution determined from the retention time of the sample and a calibration curve prepared in advance. Here, the calibration curve is prepared from several kinds of monodisperse polystyrenes used as standard samples.

Column to be used: GMHLX+G30OOHXL (manufactured by Tosoh Corporation)

Resin Production Example 1

[Resin (1)]

410 g of styrene and 90 g of 2-ethylhexyl acrylate as monomers for forming vinyl resins, and 20 g of azobisisobutyronitrile as a polymerization initiator are placed into a dropping funnel. 780 g of polyoxypropylene(2.2)-2,2-bis(4-hydroxyphenyl)propane, 24 g of fumaric acid, 76 g of isododecenyl succinic anhydride, 250 g of terephthalic acid, and 2 g of dibutyltin oxide are placed in a five-liter four-neck glass flask equipped with a thermometer, a stainless steel stirring rod, a reflux condenser, and a nitrogen inlet tube. To the mixture contained in the glass flask, a mixture comprising the monomers for forming the vinyl resins and the polymerization initiator is added dropwise from the above dropping funnel over a period of 1 hour while heating the contents at 135° C. in a mantle heater in a nitrogen gas atmosphere and stirring the contents. The reaction mixture is matured for 2 hours while keeping the temperature at 135° C., and then the temperature is elevated to 230° C. to react the components.

The degree of polymerization is monitored from a softening point measured by the method according to ASTM E 28-67, and the reaction is terminated when the softening point reaches 120° C.

The obtained resin has a glass transition temperature (Tg) with a single peak at 60° C. The average diameter of the dispersed domain of the vinyl resin is 0.5 μm, showing a good dispersion state. Here, the diameter of the dispersed domain can be measured by the method comprising the steps of slicing the resin having a diameter of 0.2 mm using a microtome to a thickness of 150 nm, and observing the obtained thin slices using a transmission scanning electron microscope ("JEM-2000," manufactured by JEOL (Nihon Denshi Kabushiki Kaisha)).

The polymerization reaction of the vinyl resin is completed before reaching the reaction temperature of 230° C. At completion, the vinyl resin has a number-average molecular weight of 10,000 as determined by GPC.

This obtained resin is denoted as "Binder Resin 1a."

Resin Production Example 2

[Resin(1)]

350 g of styrene and 150 g of n-butyl methacrylate as monomers for forming vinyl resins, and 25 g of dicumyl peroxide as a polymerization initiator are placed into a dropping funnel. 780 g of polyoxypropylene(2.2)-2,2-bis(4-hydroxyphenyl)propane, 240 g of isophthalic acid, 76 g of 1,2,4-benzenetricarboxylic acid, 22 g of fumaric acid, and 2 g of dibutyltin oxide are placed in a five-liter four-neck glass flask equipped with a thermometer, a stainless steel stirring rod, a reflux condenser, and a nitrogen inlet tube. The subsequent procedures are carried out under the same polymerization conditions as in Resin Production Example 1.

The obtained resin is evaluated in the same manner as in Resin Production Example 1. As a result, the resin has a glass transition temperature (Tg) with a single peak at 62° C., and the average diameter of the dispersed domain of the vinyl resin is 2.0 $\mu$m.

The number-average molecular weight of the vinyl resin at completion of the addition polymerization reaction before raising the temperature to 230° C. is 17,000.

This obtained resin is denoted as "Binder Resin 1b."

Resin Production Example 3

550 g of xylene is placed in a two-liter four-neck glass flask equipped with a thermometer, a stainless steel stirring rod, a reflux condenser, and a nitrogen inlet tube. After replacing with a nitrogen gas, the temperature is elevated to 135° C.

700 g of styrene and 300 g of n-butyl methacrylate as monomers for forming vinyl resins, and 30 g of dicumyl peroxide as a polymerization initiator are placed into a dropping funnel. To the contents of the glass flask, the above mixture is added dropwise from the above dropping funnel for a period of 1 hour while keeping the temperature at 135° C. The reaction mixture kept at 135° C. is matured for 2 hours, and then the temperature is elevated to 200° C. to remove xylene from the mixture under a reduced pressure, and the obtained product is taken out on a vat. After cooling the product, the cooled product is pulverized.

The obtained resin is evaluated in the same manner as in Resin Production Example 1. The obtained resin has a softening point measured by the method according to ASTM E28-67 of 110° C. and a glass transition temperature of 66° C. Also, the number-average molecular weight of the resin as determined by gel permeation chromatography (GPC) is 28,000.

This obtained resin is denoted as "Binder Resin c."

Resin Production Example 4

780 g of polyoxypropylene(2.2)-2,2-bis(4-hydroxyphenyl)propane, 240 g of isophthalic acid, 76 g of 1,2,4-benzenetricarboxylic acid, and 2 g of dibutyltin oxide, which are the same components used in Resin Production Example 2, are allowed to react for homopolymerization at 230° C. in the same manner as in Resin Production Example 2.

The obtained resin is evaluated in the same manner as in Example 1. As a result, the resin has a softening point of 130° C. and a glass transition temperature of 60.3° C.

This obtained resin is denoted as "Binder Resin d."

Resin Production Example 5

[Resin (2)]

900 g of xylene is added in a two-liter four-neck glass flask equipped with a thermometer, a stainless steel stirring rod, a reflux condenser, and a nitrogen inlet tube. A mixture comprising 765 g of styrene, 180 g of 2-ethylhexyl acrylate, and 27 g of N,N-dimethylaminomethyl methacrylate as monomers for forming vinyl resins having a positive charge functional group, and 18 g of azobisisobutyronitrile as a polymerization initiator is placed into a dropping funnel and added dropwise to the contents of the glass flask from the dropping funnel for a period of 2 hours while keeping the temperature at 80° C. After terminating the dropwise addition, the reaction mixture kept at 80° C. is matured for 4 hours to complete the polymerization. Xylene is removed from the mixture under a reduced pressure, and the obtained product is taken out on a vat. After cooling the product, the cooled product is pulverized, to give a transparent resin.

The obtained resin has a softening point of 128° C. and a glass transition temperature of 66° C.

This obtained resin is denoted as "Binder Resin 2a."

Resin Production Example 6

[Resin (2)]

1400 g of ion-exchanged water and 7 g of cetyl trimethylammonium chloride are placed in two-liter four-neck glass flask equipped with a thermometer, a stainless steel stirring rod, a reflux condenser, and a nitrogen inlet tube. After raising the temperature of the contents to 70° C., 7 g of a dihydrochloric salt of 2,2'-azobis(2-methyl-N-propionamidine) dissolved in 50 g of ion-exchanged water is introduced into the above flask. Thereafter, a mixture comprising 175 g of styrene, 52.5 g of methyl methacrylate, and 122.5 g of n-butyl methacrylate is placed into a dropping funnel and added dropwise to the contents in the flask from the dropping funnel over a period of 1 hour. After the dropwise addition is completed, the resulting mixture kept at 70° C. is matured for 1.5 hours, followed by salting-out, washing and drying of the obtained product to give a resin.

The obtained resin has a softening point of 153° C. and a glass transition temperature of 65° C.

This obtained resin is denoted as "Binder Resin 2b."

Examples 1 through 4, and Comparative Examples 1 and 2

Each of the materials having the following compositions given below is blended with a Henschel mixer (manufactured by Mitsui Mitsuike Kakoki Kabushiki Kaisha) in advance, and the obtained mixture is kneaded using a twin-screw extruder. After cooling the extruded product, the cooled product is pulverized and classified to give an untreated toner having an average particle diameter of 10.5 $\mu$m.

Compositions

Example 1

| | |
|---|---|
| Binder Resin 1a | 70 parts by weight |
| Binder Resin 2a | 30 parts by weight |
| Carbon Black "REGAL 330R" (Manufactured by Cabot Corporation) | 6 parts by weight |
| Low-Molecular Weight Polypropylene "NP-055" (Manufactured by Mitsui Petrochemical Industries, Ltd.) | 2 parts by weight |

Example 2

| | |
|---|---|
| Binder Resin 1b | 70 parts by weight |
| Binder Resin 2a | 30 parts by weight |
| Carbon Black "REGAL 330R" (Manufactured by Cabot Corporation) | 6 parts by weight |
| Low-Molecular Weight Polypropylene "NP-055" (Manufactured by Mitsui Petrochemical Industries, Ltd.) | 2 parts by weight |

Example 3

| | |
|---|---|
| Binder Resin 1a | 70 parts by weight |
| Binder Resin 2b | 30 parts by weight |
| Carbon Black "REGAL 330R" (Manufactured by Cabot Corporation) | 6 parts by weight |
| Low-Molecular Weight Polypropylene "NP-055" (Manufactured by Mitsui Petrochemical Industries, Ltd.) | 2 parts by weight |

Example 4

| | |
|---|---|
| Binder Resin 1a | 70 parts by weight |
| Binder Resin 2a | 30 parts by weight |
| Quaternary Ammonium Salt "P-51" (Manufactured by Orient Chemical Co., Ltd.) | 0.5 parts by weight |
| Carbon Black "REGAL 330R" (Manufactured by Cabot Corporation) | 6 parts by weight |
| Low-Molecular Weight Polypropylene "NP-055" (Manufactured by Mitsui Petrochemical Industries, Ltd.) | 2 parts by weight |

Comparative Example 1

| | |
|---|---|
| Binder Resin c | 70 parts by weight |
| Binder Resin 2a | 30 parts by weight |
| Carbon Black "REGAL 330R" (Manufactured by Cabot Corporation) | 6 parts by weight |
| Low-Molecular Weight Polypropylene "NP-055" (Manufactured by Mitsui Petrochemical Industries, Ltd.) | 2 parts by weight |

Comparative Example 2

| | |
|---|---|
| Binder Resin d | 70 parts by weight |
| Binder Resin 2a | 30 parts by weight |
| Carbon Black "REGAL 330R" (Manufactured by Cabot Corporation) | 6 parts by weight |

-continued

| | |
|---|---|
| Low-Molecular Weight Polypropylene "NP-055" (Manufactured by Mitsui Petrochemical Industries, Ltd.) | 2 parts by weight |

0.3 parts by weight of alumina fine particles which are subject to hydrophobic treatment using hexamethyl disilazane are blended using Henschel mixer with 100 parts by weight of each of the untreated toners obtained in Examples 1 to 4, and Comparative Examples 1 and 2 mentioned above, thereby adhering the alumina fine particles on the toner surface, to give each of the toners.

A developer is prepared by blending 39 parts by weight of each of the toners thus prepared with 1261 parts by weight of ferrite powder coated with a silicone resin having an average particle diameter of 100 pm. The developer is used to evaluate triboelectric charge by the following method.

The triboelectric charges at 30 seconds or at 10 minutes are measured after blending the developer in a ball-mill (manufactured by Kao Corporation; container having a diameter of 35 mm, a depth of 40 mm, and rotational speed: 250 rpm) for 30 seconds or 10 minutes.

Each of the triboelectric charges is measured by a blow-off type electric charge measuring device equipped with a Faraday cage, a capacitor, and an electrometer as described below. First, W (g) (about 0.15 to 0.20 g) of the developer prepared above is placed into a brass measurement cell equipped with a stainless screen of 500 mesh, which is adjustable to any mesh size to block the passing of the carrier particles. Next, after aspirating from a suction opening for 5 seconds, blowing is carried out for 5 seconds under a pressure indicated by a barometric regulator of 0.6 kgf/$cm^2$, thereby selectively removing only the toner from the cell.

In this case, the voltage of the electrometer after 2 seconds from the start of blowing is defined as V (volt). Here, when the electric capacitance of the capacitor is defined as C ($\mu$F), the triboelectric charge Q/m of this toner can be calculated by the following equation:

$$Q/m(\mu C/g)=C\times V/m$$

Here, m is the weight of the toner contained in W (g) of the developer. When the weight of the toner in the developer is defined as T (g) and the weight of the developer as D (g), the toner concentration in a given sample can be expressed as T/D×100(%), and m can be calculated as shown in the following equation:

$$m(g)=W\times(T/D)$$

The results of the triboelectric charge at 10 minutes are shown in Table 1.

Also, the charging-up speed of the developer is evaluated by the proportion between the triboelectric charge at 10 minutes and the triboelectric charge at 30 seconds. Specifically, the value of the charging-up speed in Table 1 is calculated by the following equation.

$$\text{Charging-Up Speed} = \frac{\text{Triboelectric charge at 30 seconds}}{\text{Triboelecetric charge at 10 minutes}}$$

Further, a distribution of triboelectric charges is measured using E-SPART ANALYSER (manufactured by Hosokawa Micron Co.), so that the proportion of reversely charged toner can be calculated. Moreover, the dispersibility of the resin (1) and the resin (2) is evaluated by the following method. Here, the diameter of the dispersed domain can be measured by the method comprising the steps of slicing the resin having a diameter of 0.2 mm using a microtome to a thickness of 150 nm, and observing the obtained thin slices using a transmission scanning electron microscope ("JEM-2000," manufactured by JEOL (Nihon Denshi Kabushiki Kaisha)). The results are shown in Table 1.

TABLE 1

| Toner | Tribo-electric Charge (after 10 min.) ($\mu$C/g) | Charging-Up Speed | Proportion of Reversely Charged Toner (%) | Dispersion State of Styrene-Acrylic Resin in Toner |
|---|---|---|---|---|
| Example 1 | 15.1 | 0.89 | 1.2 | Domain Having 0.3 $\mu$m Diameter |
| Example 2 | 16.3 | 0.92 | 1.6 | Domain Having 0.8 $\mu$m Diameter |
| Example 3 | 17.8 | 0.94 | 0.4 | Domain Having 0.3 $\mu$m Diameter |
| Example 4 | 13.9 | 1.05 | 0.3 | Domain Having 0.3 $\mu$m Diameter |
| Comparative Example 1 | 19.9 | 0.60 | 6.9 | Uniformly Dispersed |
| Comparative Example 2 | 8.2 | 0.90 | 11.3 | Layered Structure (Layer Thickness: about 1 $\mu$m) |

As is clear from Table 1, the toners of the present invention (Examples 1 to 4) have suitable triboelectric charges at 10 minutes, high charging-up speeds, and only a small proportion of reversely charged toners. Particularly, in the case of Example 4 where a quaternary ammonium salt is used, the charging-up speed is remarkably higher than the other cases. By contrast, in the case of Comparative Example 1 where a styrene-acrylic resin is used in place of the resin (1), the styrene-acrylic resin is uniformly dispersed in the toner, thereby undesirably making the charging-up speed of the toner low. Also, in the case of Comparative Example 2 where a polyester resin is used in place of the resin (2), the triboelectric charge is not sufficiently elevated even though the charging-up speed is high, and the proportion of reversely charged toner is large.

Printing Test

Toner in Example 1 of the present invention is used in a modified apparatus of a commercially available copy machine ("SF-8350," manufactured by Sharp Corporation) to develop images, and printing durability is evaluated. As a result, it is found that after 100,000 sheets of continuous copying, good fixed images can be stably formed free from background.

The fixing ability is also evaluated using the machine and the toner mentioned in the printing durability test while varying the fixing temperatures. It is found that the toner of the present invention provides a good low-temperature fixing ability and a good offset resistance.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A binder resin for a toner comprising:

(a) a resin (1) which forms a matrix in the toner, said resin (1) being a hybrid resin of a polyester resin and a vinyl resin; and (b) a resin (2) which forms a domain dispersed in the matrix formed by the resin (1), said resin (2) being a vinyl resin having a positive charge functional group.

2. The binder resin according to claim 1, wherein said resin (1) is produced by a process comprising the step of concurrently carrying out a condensation polymerization and an addition polymerization in one reaction vessel with monomers for polymerizing polyester resins, monomers for polymerizing vinyl resins, and a compound reacting with both monomers.

3. The binder resin according to claim 1, wherein vinyl resin in the resin (1) comprises one or more styrene monomer components.

4. The binder resin according to claim 2, wherein said compound reacting with both monomers is selected from the group consisting of fumaric acid, acrylic acid, and methacrylic acid.

5. The binder resin according to claim 1, wherein the amount of the polyester resin in said resin (1) is 51 to 95% by weight.

6. The binder resin according to claim 1, wherein said vinyl resin having a positive charge functional group comprises monomer components of polystyrene or styrene-acrylic copolymer.

7. The binder resin according to claim 1, wherein said positive charge functional group is a nitrogen-containing functional group or a phosphorus-containing functional group.

8. The binder resin according to claim 1, wherein said vinyl resin having a positive charge functional group is produced by a process comprising the step of copolymerizing monomers of a vinyl resin with a nitrogen-containing monomer or a phosphorus-containing monomer.

9. The binder resin according to claim 8, wherein said nitrogen-containing monomer or said phosphorus-containing monomer is selected from the group consisting of N,N-dialkylaminoalkyl (meth)acrylates, N,N-dialkylaminoalkyl (meth)acrylamides, N-vinyl compounds, vinylpyridine, morpholinoethyl (meth)acrylate, (meth) acryloyloxyethyl trimethyl ammonium chloride, (meth) acryloylaminopropyl trimethyl ammonium chloride, allyltriphenylphosphonium bromide, and allyltriphenylphosphonium chloride.

10. The binder resin according to claim 1, wherein the blending ratio (parts by weight) of the resin (1) to the resin (2) is from 99/1 to 50/50.

* * * * *